US009990220B2

(12) United States Patent
Vavrick et al.

(10) Patent No.: US 9,990,220 B2
(45) Date of Patent: *Jun. 5, 2018

(54) HYPERVISOR REMEDIAL ACTION FOR A VIRTUAL MACHINE IN RESPONSE TO AN ERROR MESSAGE FROM THE VIRTUAL MACHINE

(71) Applicant: VMware, Inc., Palo Alto, CA (US)

(72) Inventors: Rostislav Vavrick, Malden, MA (US); Keith Farkas, San Carlos, CA (US); Smriti Desai, San Jose, CA (US); Baruch Oxman, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/961,878

(22) Filed: Dec. 7, 2015

(65) Prior Publication Data

US 2016/0216992 A1    Jul. 28, 2016

Related U.S. Application Data

(63) Continuation of application No. 13/920,689, filed on Jun. 18, 2013, now Pat. No. 9,208,015.

(51) Int. Cl.
| | |
|---|---|
| *G06F 11/00* | (2006.01) |
| *G06F 9/455* | (2018.01) |
| *G06F 11/07* | (2006.01) |
| *G06F 9/445* | (2018.01) |

(52) U.S. Cl.
CPC .......... *G06F 9/45558* (2013.01); *G06F 9/445* (2013.01); *G06F 9/45533* (2013.01); *G06F 11/0712* (2013.01); *G06F 11/0793* (2013.01); *G06F 2009/45591* (2013.01)

(58) Field of Classification Search
CPC ............. G06F 11/0793; G06F 11/0712; G06F 11/1441; G06F 11/1443; G06F 11/301; G06F 9/445; G06F 9/45533; G06F 9/45558; G06F 9/4862; G06F 9/485; G06F 9/4856; G06F 9/4868; G06F 9/505; G06F 9/5083; G06F 2009/45591; G06F 2009/4557; G06F 2009/45575
See application file for complete search history.

(56) References Cited

U.S. PATENT DOCUMENTS

| | | | |
|---|---|---|---|
| 8,413,144 B1 | 4/2013 | Manhmohan | |
| 8,549,516 B2 * | 10/2013 | Warfield | G06F 9/45533 718/1 |
| 8,819,673 B1 | 8/2014 | Wilkinson | |

(Continued)

OTHER PUBLICATIONS

Non-Final Office Action for U.S. Appl. No. 13/920,689 dated Mar. 20, 2015, 25 pages.

(Continued)

*Primary Examiner* — Bryce P Bonzo
*Assistant Examiner* — Anthony J Amoroso

(57) ABSTRACT

Exemplary methods, apparatuses, and systems include a hypervisor receiving an error message from an agent within a first virtual machine run by the hypervisor. In response to the error message, the hypervisor determines and initiates a corrective action for the hypervisor to take in response to the error message. An exemplary corrective action includes initiating a reset of the first virtual machine or a reset of a second virtual machine.

17 Claims, 4 Drawing Sheets

(56) References Cited

U.S. PATENT DOCUMENTS

| | | | |
|---|---|---|---|
| 8,856,585 B2* | 10/2014 | Bauer | H04L 41/0668 |
| | | | 714/4.2 |
| 8,910,156 B1 | 12/2014 | Kenchammana-Hosekote | |
| 2012/0311576 A1 | 12/2012 | Shu et al. | |
| 2013/0275805 A1* | 10/2013 | Harper | G06F 11/1438 |
| | | | 714/16 |
| 2013/0275808 A1 | 10/2013 | Harper et al. | |
| 2014/0372788 A1 | 12/2014 | Vavrick | |

OTHER PUBLICATIONS

VMware vCenter Site Recovery Manager 5.1, Product Datasheet, VMware, Inc.; 2012, 4 pages.

* cited by examiner

HYPERVISOR REMEDIAL ACTION FOR A VIRTUAL MACHINE IN RESPONSE TO AN ERROR MESSAGE FROM THE VIRTUAL MACHINE

This application is a continuation of and claims priority from U.S. application Ser. No. 13/920,689, filed on Jun. 18, 2013, entitled "HYPERVISOR REMEDIAL ACTION FOR A VIRTUAL MACHINE IN RESPONSE TO AN ERROR MESSAGE FROM THE VIRTUAL MACHINE", the contents of which is incorporated herein by reference in its entirety.

FIELD OF THE INVENTION

The various embodiments described herein relate to initiating a virtualization software layer reset of or another corrective action for a virtual machine. In particular, embodiments relate to a hypervisor receiving an error message directly from the virtual machine and initiating the corrective action for the virtual machine in response to the error message.

BACKGROUND OF THE INVENTION

Virtualization software, commonly referred to as a hypervisor, enables multiple virtual machines to be executed on a host hardware platform. The hypervisor manages the allocation of computing resources to each virtual machine on the host. Additionally, the hypervisor may receive a heartbeat data signal from each virtual machine as an indication of the virtual machine operating normally. If the hypervisor has not received the heartbeat for a period of time, it may be implied that the virtual machine is having a problem. After the period of time has expired, the hypervisor will reset the virtual machine in an effort to return the virtual machine to normal operation. Failure to receive a heartbeat, however, is not always due to a problem that requires the hypervisor to reset the virtual machine. For example, the problem may be due to a problem with or delay caused by a virtual machine software agent responsible for transmitting the heartbeat rather than a problem with the virtual machine's operating system. The period of time that elapses without a heartbeat may therefore include a delay to address this uncertainty. Such a delay allows the virtual machine heartbeat an opportunity to recover, e.g., if the problem that has prevented transmission of the heartbeat does not require a reset of the virtual machine. Allowing the heartbeat an opportunity to recover prevents unnecessary resets of the virtual machine. This delay, however, also slows down recovery when the problem does require a reset of the virtual machine.

A virtual machine may also be reset (or restarted) in response to a user command through the virtual machine's operating system. If the virtual machine is overloaded or the operating system is failing to function properly, however, the user's command may fail or the reset/restart may take longer than desired.

Furthermore, an external management server may be used to provision, update, patch, and secure the virtual machines across multiple hosts. The external management server may transmit a request to the hypervisor to initiate a reset and/or move a virtual machine, e.g., for load balancing or in response to input from an administrator or user. Using an external management server to reset the virtual machine, however, adds a component to the critical path for the reset. Adding a component to the critical path increases the chance for delay, errors, and problems arising from lost connections with the management server.

SUMMARY OF THE INVENTION

Exemplary methods, apparatuses, and systems include a hypervisor receiving an error message from an agent within a first virtual machine run by the hypervisor. For example, the hypervisor may receive the error message via a trusted communication channel between the agent within the first virtual machine and the hypervisor. In response to the error message, the hypervisor determines and initiates a corrective action for the hypervisor to take in response to the error message. In one embodiment, the corrective action includes initiating a reset of the first virtual machine or a reset of a second virtual machine.

In one embodiment, the hypervisor further receives an error message from an agent within the second virtual machine and determines a dependency between the first virtual machine and the second virtual machine. In response to the determined dependency and the error messages, the hypervisor initiates the corrective action with respect to the second virtual machine in response to the error message from the agent of the first virtual machine and the error message from the agent of the second virtual machine.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include a hypervisor initiating a corrective action for a first virtual machine or for a second virtual machine in response to receiving an error message from an agent within the first virtual machine. In contrast to the reliance upon a heartbeat, the hypervisor initiates the corrective action for the virtual machine (e.g., which may include resetting the virtual machine) without the delay associated with the above-described uncertainty around the cause of the stopped heartbeat. The hypervisor receives the error message via a trusted communication channel between the agent within the first virtual machine and the hypervisor, or another channel independent of commands from the virtual machine's operating system (e.g., a user-initiated reset) or virtual networking stack. As a result, the virtual machine alerts the hypervisor to the need for a corrective action without user intervention or the delay of utilizing the virtual networking stack. Enabling the hypervisor to determine which corrective action, if any, to take in response to an error message provides an easily deployed solution that does not require configuring an external monitor. Additionally, being able to avoid the use of an external device and a network connection to initiate the corrective action for the virtual machine removes a component to the critical path for the corrective action, decreasing the chance for delay and errors.

Figure 1:
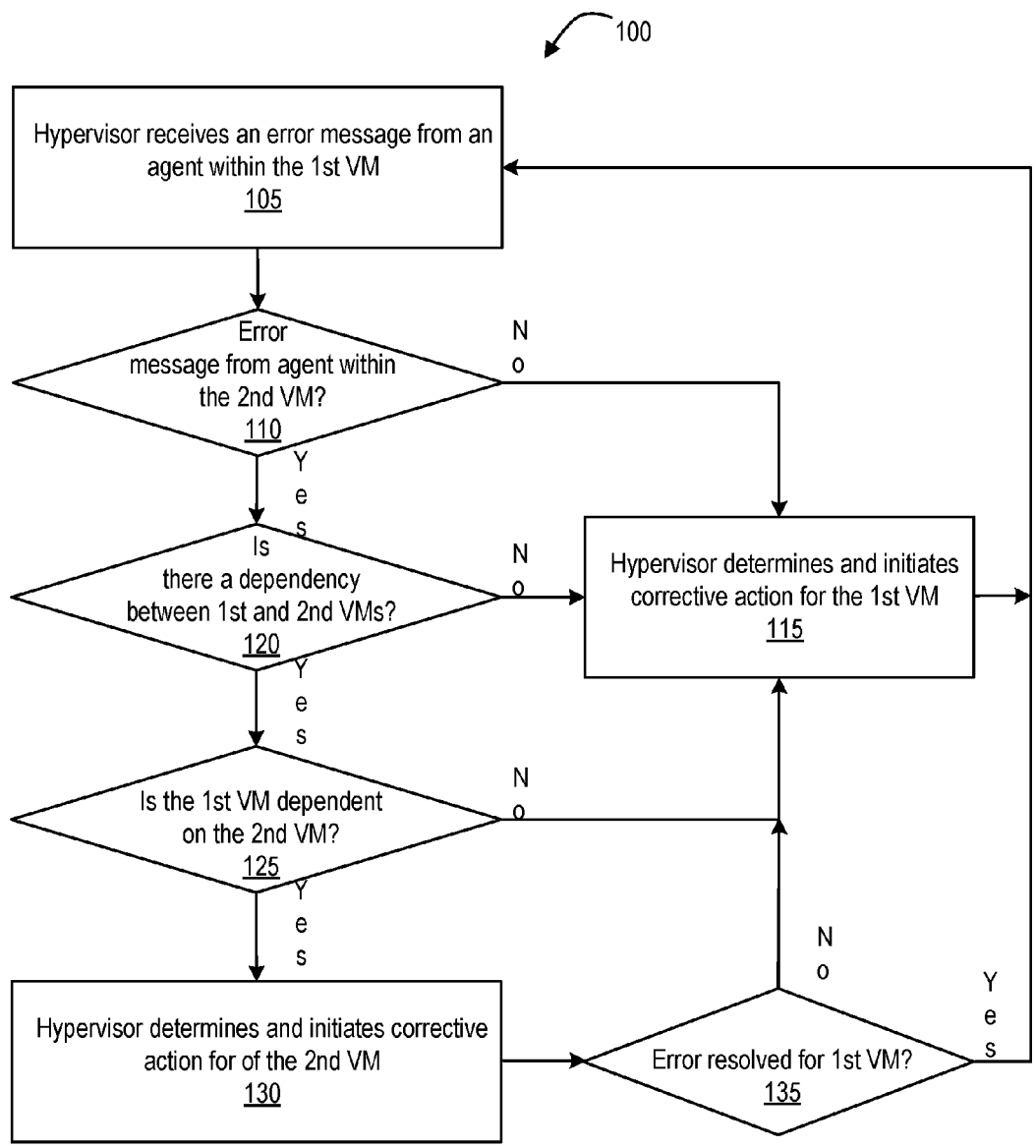
FIG. 1 is a flow chart illustrating an exemplary method of a hypervisor initiating a corrective action for a virtual machine in response to receiving an error message from an agent within the virtual machine.

FIG. 1 is a flow chart illustrating exemplary method 100 of a hypervisor initiating a corrective action for a virtual machine in response to receiving an error message from an agent within the virtual machine. At block 105, the hypervisor receives an error message from an agent within a first virtual machine running on the hypervisor. In one embodiment, the error message requests that the hypervisor reset the first virtual machine or perform another specific corrective action. Alternatively, or additionally, the error message includes a state of the operating system or an application running on the first virtual machine or a state of a connection between the first virtual machine and an external resource (e.g., a storage device, a server, a network, etc.). The state of an operating system or application may indicate that the operating system or application is not operating properly. The state of a connection may indicate that a connection is lost or that an external resource is not responding in a timely manner. The error message further indicates a need for the hypervisor to perform a corrective action, e.g., for the first virtual machine or a second virtual machine.

As used herein, a corrective action refers to initiating a reset of a virtual machine, sending a message to an administrator, generating a report for an administrator, reconfiguring a setting for a virtual machine, allocating additional resources for a virtual machine, moving a virtual machine connection from one storage device to another, powering off or suspending a related virtual machine, initiating a reset of a related virtual machine, restarting an application for multiple virtual machines, reverting a virtual machine to a previous snapshot, or a combination thereof. As used herein, resetting a virtual machine may also be referred to as restarting or rebooting of the virtual machine. In one embodiment, the hypervisor attempts to reset the first virtual machine in a manner that allows the operating system of the first virtual machine to attempt to save any work in progress. For example, the hypervisor may send a shut down signal to the operating system to save work in progress and restart the first virtual machine. If the operating system does not respond to the shut down signal, the hypervisor may then forcibly reset the virtual machine. Alternatively, the hypervisor resets the first virtual machine without consideration for work in progress.

Virtual machines may interact with one another. As a result, a functionality of one virtual machine may be dependent upon a functionality of another virtual machine. For example, a first virtual machine may attempt to access a database managed by a second virtual machine. An error message related to the first virtual machine's ability to access the database might therefore be due to an error with the first virtual machine or due to an error with or otherwise affecting the second virtual machine (e.g., the second virtual machine may have an internal problem with an application related to an external database or the second virtual machine may have an external problem, such as a lost connection to the external database).

In one embodiment, the hypervisor determines a corrective action to take in response to an error message based upon dependencies between virtual machines, the content of an error message, and/or other criteria. For example, determining a corrective action may include selecting a corrective action from a table or other data structure storing correlations between corrective actions and one or more of error message content, error message type, software running on the virtual machine, service(s) performed by the virtual machine, virtual machine dependencies, etc. In an embodiment in which the hypervisor determines to take a corrective action of resetting of a virtual machine, the reset is initiated by the hypervisor in response to the determination rather than, e.g., in response to a virtual machine calling an operating system restart method. For example, the hypervisor may determine to reset a virtual machine based upon information that is not available to the virtual machine, such as a disk controller having failed, a disk not being accessible, a network/connection being down, etc.

In an embodiment that considers such dependencies, at block 110, the hypervisor determines if it has also received an error message from an agent within the second virtual machine or detected an issue affecting a second virtual machine (e.g., loss of a network connection). If the hypervisor has not received an error message from the agent within the second virtual machine, or in an embodiment that does not consider dependencies, at block 115, the hypervisor determines and initiates a corrective action for the first virtual machine in response to the error message from the agent in the first virtual machine.

In an embodiment in which the determined corrective action is a reset, the hypervisor determines how to reset the virtual machine (e.g., with or without consideration for work in progress) based upon the received error message. For example, a policy (associated with or sent by the virtual machine) may indicate whether or not the hypervisor may attempt to reset the first virtual machine with consideration for work in progress.

In one embodiment, the hypervisor resets the first virtual machine within the host device in which the first virtual machine is currently running. Alternatively, the hypervisor moves or requests another device to move the first virtual machine from a first host device running the hypervisor to a second host device. Moving the first virtual machine may address a problem that is caused by host device. For example, the error message may be caused by the host device being overloaded or losing a connection to another device.

If the hypervisor has received an error message from an agent within a second virtual machine, at block 120, the hypervisor determines if either of the first and second virtual machines is dependent upon the other. In one embodiment, an error message includes an indication of dependency between virtual machines. Alternatively, a virtual machine registers a dependency upon another virtual machine with the hypervisor, or with an external device, upon establishing the dependent relationship or upon boot up of one the virtual machines. The hypervisor, upon receipt of the two error messages may then determine the dependency from the content of one or both of the error messages or from an internal/external data structure storing the registered dependency.

In one embodiment, the determination of dependency is limited to particular error messages. For example, an error message may indicate a predetermined problem type associated with the operating system or with an application that is unlikely to be due to a dependency upon a second virtual machine. Such an error message results in the hypervisor finding no dependency, e.g., without the hypervisor referencing an explicit dependency relationship in an error message or data structure. Alternatively, the error message may indicate a predetermined problem type that is likely to be associated with a problem caused by another virtual machine.

In one embodiment, the determination of dependency further includes determining if the dependency is related to the error message(s). For example, the hypervisor may receive an error message from the first virtual machine agent indicating a problem with reading from or writing to a database. The hypervisor may determine the error message is related to the first virtual machine's dependency upon a second virtual machine responsible for managing the database. In contrast, the hypervisor may determine that an error message indicating a problem with an application that is unrelated to the database is unrelated to the first virtual machine's dependency upon the second virtual machine managing the database.

If the hypervisor determines that there is no dependency between the first and second virtual machines, the hypervisor initiates a corrective action for the first virtual machine at block 115, as described above. If the hypervisor determines that there is a dependency between the first and second virtual machines, at block 125, the hypervisor determines if the first virtual machine is dependent upon the second virtual machine. If the first virtual machine is not dependent upon the second virtual machine, the hypervisor initiates a corrective action for the first virtual machine at block 115, as described above.

If the first virtual machine is dependent upon the second virtual machine, at block 130, the hypervisor determines and initiates a corrective action for the second virtual machine. In one embodiment, the hypervisor resets or requests that another device reset the second virtual machine within the host device in which the second virtual machine is currently running. Alternatively, the hypervisor moves or requests another device to move the second virtual machine from a first host device running the hypervisor to a second host device.

At block 135, following the initiation of a corrective action for the second virtual machine, the hypervisor optionally determines if the corrective action for the second virtual machine resolved the error for the first virtual machine. For example, the hypervisor may wait for a configurable period of time for the first virtual machine to indicate that the error has been resolved. In one embodiment, the first virtual machine indicates that the error has been resolved by default. Alternatively, the hypervisor sends a response to the error message to the agent in the first virtual machine to request that the agent reassess the cause of the error message and indicate if the corrective action initiated for the second virtual machine resolved the error. If the error for the first virtual machine has not been resolved by the corrective action for the second virtual machine, at block 115, the hypervisor initiates a corrective action for the first virtual machine. Alternatively, a policy may dictate that the first virtual machine should be reset, or subject to another corrective action, in addition to initiating the corrective action for the second virtual machine.

If or when the error is resolved for the first virtual machine, the method may return to block 105 and await another error message.

Figure 2:
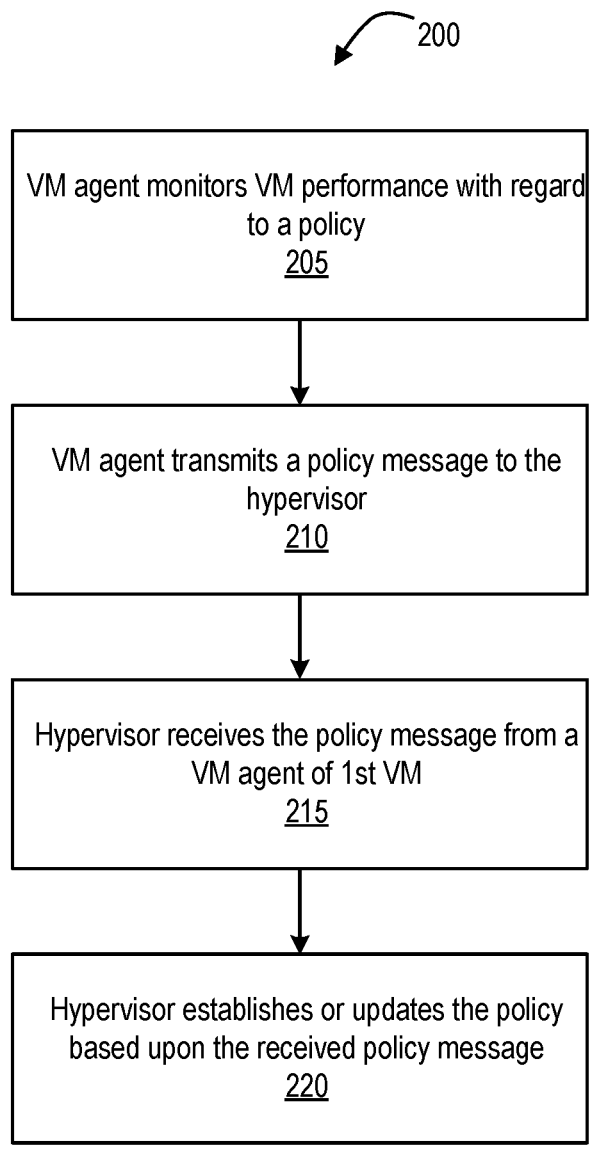
FIG. 2 is a flow chart illustrating an exemplary method of a hypervisor establishing or updating a policy for managing a virtual machine based upon a policy message received from an agent within the virtual machine.

FIG. 2 is a flow chart illustrating exemplary method 200 of a hypervisor establishing or updating a policy for managing a virtual machine based upon a policy message received from an agent within the virtual machine. Policies may include how the hypervisor is to react to an error message or the lack of a heartbeat. For example, a policy may state the length of the above-described delay, or amount of time, during which a hypervisor waits before reacting to a failure to receive a heartbeat from a virtual machine. Additionally, a policy may state the length of time a hypervisor waits before reacting to a failure to receive a response from a network connection or an external device (virtual or physical), a failure to receive confirmation of an application completing a task, failure to receive data to be read from a data source, etc.

At block 205, an agent within a virtual machine monitors the virtual machine's performance with regard to a policy. For example, the agent may track the amount of time the virtual machine takes to transmit a heartbeat after a reset of the virtual machine or after a reset of a software agent (within the virtual machine) that is responsible for transmitting the heartbeat to the hypervisor.

At block 210, the agent transmits a policy message to the hypervisor. In one embodiment, the policy message is a report of the monitored performance. For example, continuing with the heartbeat example, the policy message may include an amount of time that elapsed after a reset and before the virtual machine transmitted a heartbeat. The hypervisor may use the received amount(s) of time to determine a new value for the amount of delay the hypervisor should observe prior to resetting a virtual machine in response to a lack of heartbeat. In an alternate embodiment, the policy message is a request to set a policy. For example, the agent may determine a new value for the amount of delay the hypervisor should observe prior to resetting a virtual machine in response to a lack of heartbeat. The policy message may then direct the hypervisor to set the delay to the value determined by the agent. In one embodiment, the agent transmits a policy message each time the agent tracks a value related to a policy (e.g., a single instance of the amount of time elapsed prior to transmitting a heartbeat). Alternatively, the agent transmits a policy message after tracking multiple values related to a policy (e.g., multiple instances of the amount of time elapsed prior to transmitting a heartbeat) or at a predetermined interval of time. In one embodiment, the policy message indicates a specific corrective action to be taken in response to an error message.

At block 215, the hypervisor receives the policy message from the agent. In an embodiment in which the policy message includes a report of monitored performance, the hypervisor determines a new value for a corresponding policy based upon the monitored performance. In one embodiment, the new value is based upon a cumulative or average of monitored performance values. For example, referring again to the monitored heartbeat, this may include averaging the amount of time that elapsed after a reset and before the virtual machine transmitted a heartbeat for multiple resets.

At block 220, the hypervisor establishes or updates a policy based upon the received policy message. In one embodiment, establishing or updating a policy includes the hypervisor setting a new value for the policy within the memory of the host device that is accessible to the hypervisor. In an additional embodiment, establishing or updating a policy includes the hypervisor transmitting the new value for the policy to an external device for storage and future application. In one embodiment, the virtual machine stores or updates a policy with files of the virtual machine (e.g., within internal or external storage). The virtual machine's copy of the policy then becomes the source for the hypervisor to access the policy for this virtual machine. The policy may then be "self documenting" and communicated, e.g., without intervention by the management server. Instead, the policy is owned by and managed by the virtual machine.

Figure 3:
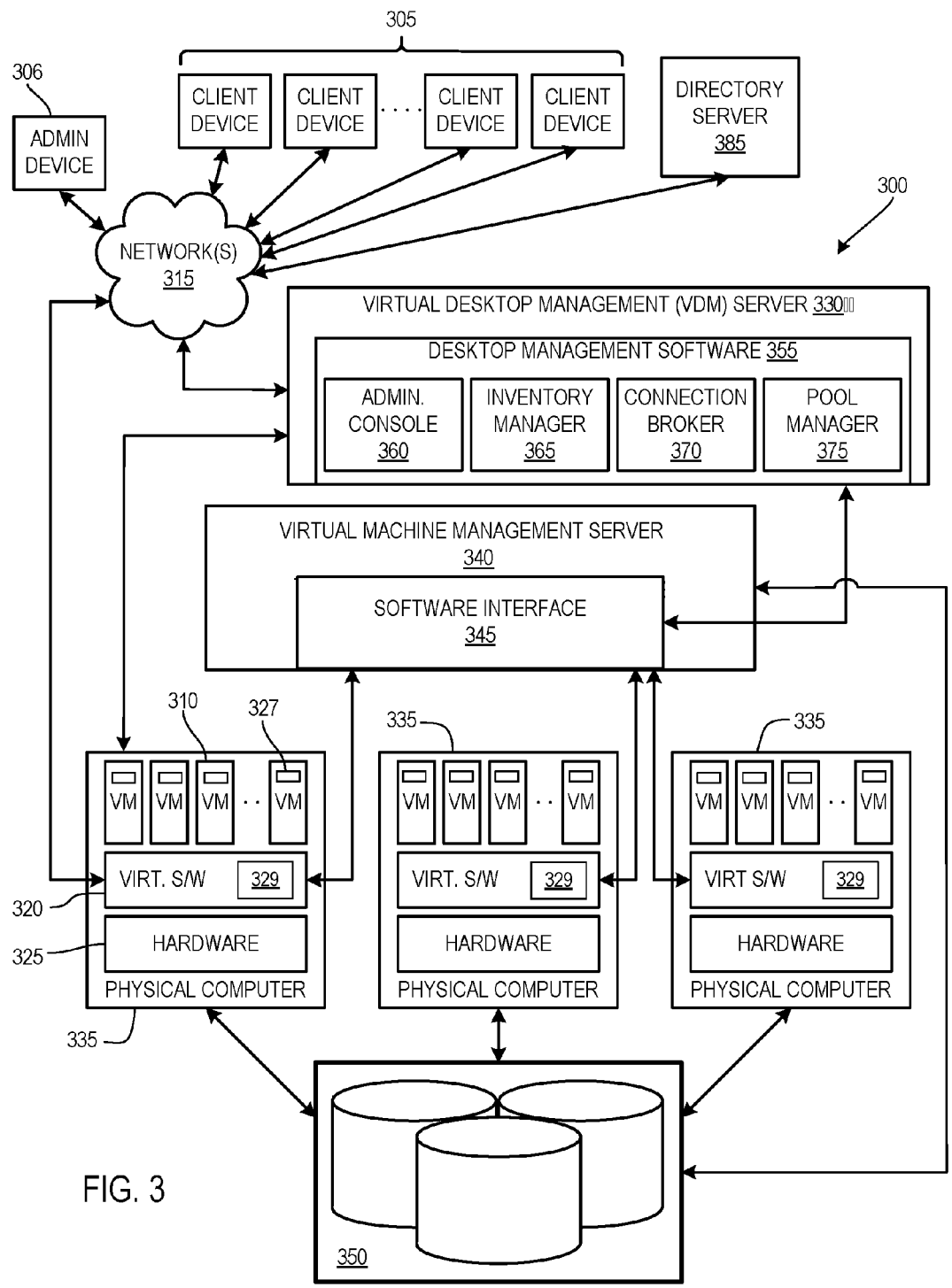
FIG. 3 illustrates, in block diagram form, an exemplary virtual desktop infrastructure environment including one or more processing systems to implement a hypervisor initiated corrective action for a virtual machine, or management of a policy for a virtual machine, in response to a message received from an agent within the virtual machine.

FIG. 3 illustrates, in block diagram form, exemplary virtual desktop infrastructure (VDI) environment 300 including one or more processing systems to implement a hypervisor initiated corrective action for a virtual machine or management of a policy for a virtual machine in response to a message received from an agent within the virtual machine. Server-based computing in a VDI environment allows client devices 305 to access centrally-managed user virtual desktops, such as those implemented by virtual machines (VM's) 310 running in a datacenter, via network(s) 315 (e.g., a local area network or other private or publically accessible wide area network, such as the Internet). For example, client device 305 and VM 310 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 310.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 305. A virtualized desktop may export user interfaces, e.g., keyboard and mouse input, audio and visual output, to client device 305 from VM 310 running remotely (in the datacenter) or locally on client device 305, or, in some cases, using a hybrid. Client device 305 transmits user input, e.g., keyboard or mouse input, to VM 310 to be processed, and receives display and other data, such as sound, from VM 310 for presentation to a user of client device 305. Client device 305 presents a bitmap representation of the desktop generated by VM 310. Inputs to and outputs from the virtualized desktop are reflected in the bitmap representation on client device 305 as it occurs on the virtualized desktop within VM 310.

VM's 310 are complete computation environments, containing virtual equivalents of the hardware and system software components of a physical system. For example, these virtual equivalents appear as a complete physical machine to a guest operating system running within VM 310. VM's 310 are typically implemented by an extensive virtualization infrastructure, which includes a variety of software and hardware components. Virtualization software layer 320 (e.g., a hypervisor) running on hardware 325 of physical computer 335 manages one or more VM's 310. Virtualization software layer 320 manages physical resources, e.g., hardware 325, as well as maintains virtual-to-physical hardware mappings.

VM's 310 each include VM agent 327. VM agent 327 may perform one or both of the agent roles in methods 100 and 200 described above. Alternatively, VM 310 may include two VM agents 327, one for each role. For example VM agent 327 monitors the state of an application or operating system of the VM 310, the state of a connection between the VM 310 and another device (physical or virtual device), or the VM 310 performance with regard to a policy. VM agent 327 further transmits an error message or policy message to the virtualization software layer 320.

Additionally, virtualization software layer 320 includes a fault manager 329. Fault manager 329 may perform one or both of the hypervisor roles in methods 100 and 200 described above. Alternatively, virtualization software layer 320 may include multiple fault managers 329, one for each role. For example, fault manager 329 receives an error message or policy message from VM agent 327 and initiates the corrective action for a VM 310 or establishes/updates a policy.

In one embodiment, agent 327 transmits the error and/or policy messages to fault manager 329 via a trusted communication channel between agent 327 and fault manager 329. Additionally, as described above, fault manager 329 may transmit messages to agent 327 via the trusted communication channel. The trusted communication channel provides agent 327 direct access to fault manager 329, or, more generally, virtualization software layer 320 independently of the guest operating system, a virtual networking interface, or similar means for transmitting information from VM 310 to virtualization software layer 320. Avoiding reliance upon the guest operating system enables agent 327 to transmit an error message to fault manager 329 when the guest operating system is non-responsive. Avoiding reliance upon a virtual networking interface enables agent 327 to transmit a message to fault manager 329 without using networking protocols and authentication that may slow down the transmission of the message. For example, VM 310 does not need an Internet Protocol (IP) address for the hypervisor or another management solution to transmit the error message or credentials to log in or otherwise authenticate the transmission of the error message. Additionally, VM 310 does not need to include a networking identification of VM 310 in the error message. In one embodiment, agent 327 runs at a root authentication level to enable direct communication (e.g., using Transmission Control Protocol/Internet Protocol (TCP/IP) or another network protocol) with fault manager 329, or more generally virtualization software layer 320. In an additional embodiment, the trusted communication channel is implemented using shared memory. Agent 327 writes the message to the shared memory and fault manager 329/virtualization software layer 320 reads the message from the shared memory.

Remote access to virtualized desktops is generally provided to client devices 305 through virtual desktop management (VDM) server 330. The VDM server 330 provides virtual desktop access to the client devices 305 and manages the corresponding VMs 310 through communications with software interface 345 of virtual machine management server (VMMS) 340. VMMS 340 is responsible for provisioning and maintaining the multitude of VM's 310 implemented across one or more physical computers (hosts) 335 as well as storage 350 utilized by VM's 310.

VMMS 340 also provides software interface 345 to enable an administrator or other entity, such as inventory manager 365, connection broker 370, and pool manager 375, to access and manage VM's 310. In one embodiment, fault managers 329 of each host 335, or virtualization software layers 320 of each host 335 communicate with one another (e.g., via VMMS 340 or a direct communication path). Communication between fault managers 329, e.g., enables fault manager 329 of a first host 335 to initiate a reset of, or other corrective action for, VM 310 on a second host 335 or move a VM 310 between hosts 335. Additionally, fault managers 329 may communicate dependencies between VMs 310 on different hosts 335. In one embodiment, one fault manager 329 is elected as a master and coordinates all activities related to corrective actions for VMs 310. If master fault manager 329 should fail, another fault manager 329 is elected master.

VDM server 330 may be a physical computer system or a virtual machine that runs desktop management software 355. Desktop management software 355 within VDM server 330 manages pools of computer resources to run VM's 310 on a set of clusters typically including multiple servers/physical computers 335 with central/graphics processing units (CPU's and/or GPU's), memory, and communications hardware. Desktop management software 355 includes a number of modules, e.g., including administrative console 360, inventory manager 365, connection broker 370, and pool manager 375.

Administrative console 360 provides a remotely-accessible user interface to administrator device 306 to manage the configuration of virtual desktops within the VDI. Administrative console 360 allows administrator device 306 to perform a plurality of functions, such as: create desktop pools, associate desktop pools with VDM server 330, associate a desktop pool with a master image, resetting a VM, define VM state policies, set storage overcommit settings for different data stores 350 used by desktop pools, and other similar operations.

Inventory manager 365 handles events received from the virtual desktops. When a user logs off or disconnects, the VM 310 sends a notification to inventory manager 365. Inventory manager 365 may also use timer-based events to schedule effective maintenance operations. Inventory manager 365 determines an effective policy that applies to the desktop and performs a maintenance operation, if required.

Connection broker 370 allows a remote user or administrator, through a client device 305 or administrator device 306, to select a type of virtual desktop and initiate a virtual desktop session or to access an existing connection to a virtual desktop. In one embodiment, connection broker 370 connects to VM 310 to access or update policies associated with VM 310 (e.g., including policies described with reference to FIG. 2).

Pool manager 375 manages the lifecycle of virtual desktops. Virtual desktops in a pool are grouped together based on similar software requirements. Desktop Administrators create logical desktops groups (desktop pools) that are provisioned typically from the same base image, including software agent 327. For example, a desktop pool may include VM's 310 that run the same set of software applications and run the same guest operating system.

Directory server 385 stores a persistent state for managing the virtual desktops. For example, one or more VM's 310 (e.g., in a desktop pool) may be associated with a policy. This policy for VM's 310 is stored in directory server 385 and accessed when VM 310 is provisioned. As described above, an exemplary policy includes the length of the above-described delay, or amount of time, during which a hypervisor waits before reacting to a failure to receive a heartbeat from a virtual machine. When a VM 310 is initiated, reset, or moved, director server 385 provides the policy to the corresponding virtualization software layer 320 for managing the VM 310. In an embodiment in which the establishing or updating a policy includes the hypervisor transmitting the new value for the policy to an external device for storage and future application (e.g., as described with reference to FIG. 2), the hypervisor may transmit the new value to VDM server 330, VMMS 340, data store(s) 350, and/or directory server 385. Additionally, in one embodiment, the virtual machine dependencies described above are stored in one or more of VDM server 330, VMMS 340, data store(s) 350, and/or directory server 385.

In one embodiment, directory server 385 additionally contains information for one or of: names of desktop pools, the number of desktops required in a pool, default power state of a pool, pool creation date, etc.; disk type for VM 310; disk replication; details of VM's 310 created in the pools; unique identifiers for user accounts; external references to external directories; entitlements including mappings between users, applications, and desktops; policies including indications of types of devices available, default display configurations, etc.; and audit events. Directory server 385 may be an instance of Active Directory, a product available from Microsoft Corp., or may be implemented by another suitable product such as an LDAP server.

Figure 4:
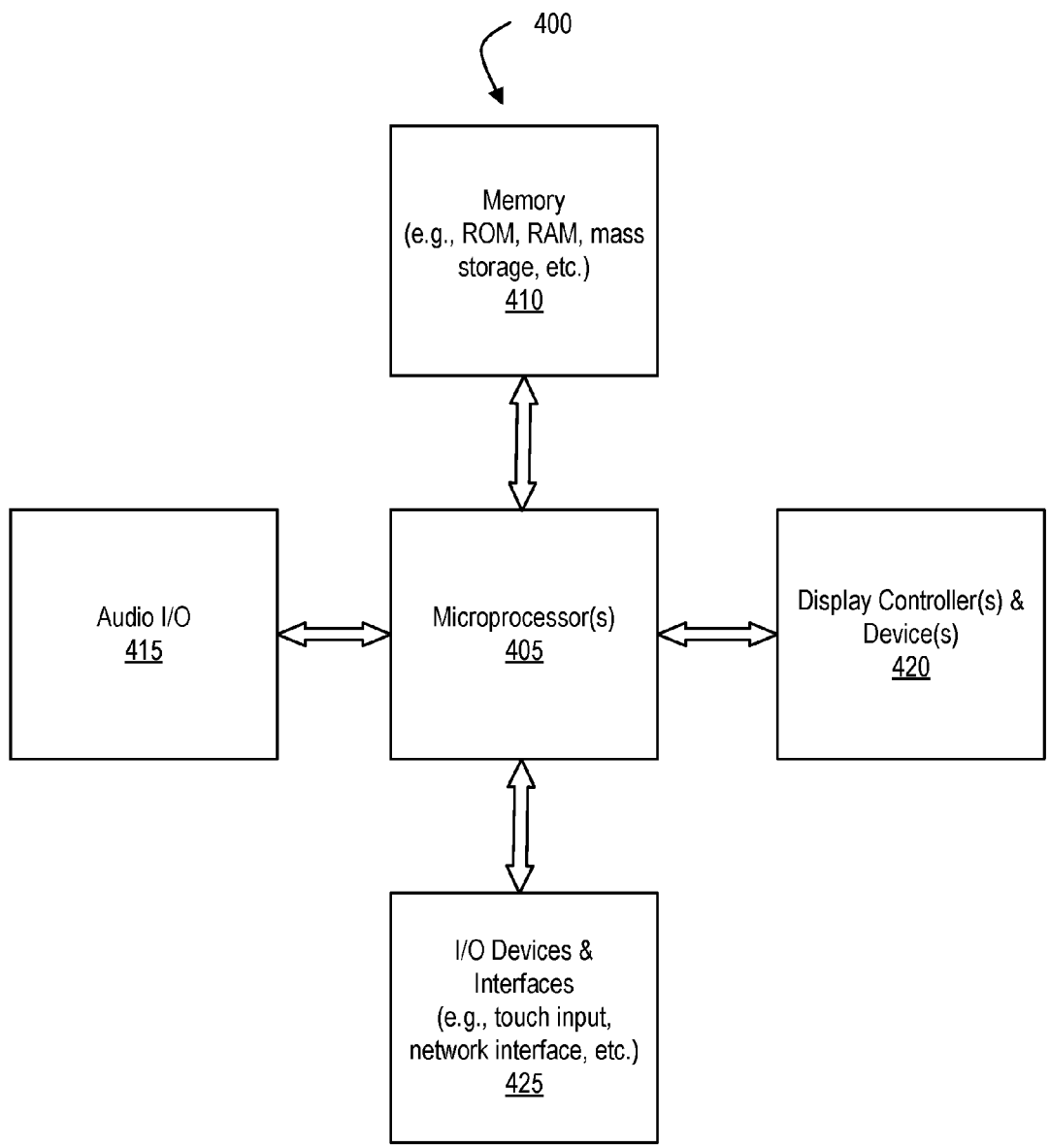
FIG. 4 illustrates, in block diagram form, an exemplary processing system to implement a hypervisor initiated corrective action for a virtual machine, or management of a policy for a virtual machine, in response to a message received from an agent within the virtual machine.

FIG. 4 illustrates, in block diagram form, exemplary processing system 400 to perform the hypervisor initiated corrective action for a virtual machine or management of a policy for a virtual machine as described herein. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory. In one embodiment, memory 410 includes shared memory used to implement a trusted communication channel between agent 327 and fault manager 329, as described above. In one embodiment, memory 410 includes storage for the virtual machine dependencies described above.

Data processing system 400 also includes audio input/output subsystem 415 which may include a microphone and/or a speaker for, for example, playing back music or other audio, receiving voice instructions to be executed by microprocessor(s) 405, playing audio notifications, etc. Display controller and display device 420 provides a visual user interface for the user.

Data processing system 400 also includes one or more input or output ("I/O") devices and interfaces 425, which are provided to allow a user to provide input to, receive output from, and otherwise transfer data to and from the system. I/O devices 425 may include a mouse, keypad or a keyboard, a touch panel or a multi-touch input panel, camera, optical scanner, network interface, modem, other known I/O devices or a combination of such I/O devices.

I/O devices and interfaces 425 may also include a port, connector for a dock, or a connector for a USB interface, FireWire, Thunderbolt, Ethernet, Fibre Channel, etc. to connect the system 400 with another device, external component, or a network. Exemplary I/O devices and interfaces 425 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

It will be appreciated that one or more buses, may be used to interconnect the various components shown in FIG. 4.

Data processing system 400 is an exemplary representation of one or more of the client device 305, administrator device 306, VDM server 330, physical computer 335, VMMS 340, and directory server 385 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 100 and 200 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 425. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
receiving a first error message from an agent within a first virtual machine running on a hypervisor, the first error message indicating a problem with a functionality of the first virtual machine;
receiving a second error message from an agent within a second virtual machine, the second error message indicating a problem with a functionality of the second virtual machine;
determining a dependency between the functionality of the first virtual machine and the functionality of the second virtual machine;
determining a corrective action for the hypervisor to take in response to the determined dependency and the first and second error messages; and
initiating the corrective action with respect to the second virtual machine to address the problem with the functionality of the first virtual machine, wherein the corrective action is initiated in response to the determined dependency and the first and second error messages.

2. The computer-implemented method of claim 1, wherein the first error message includes a state of an application running on the first virtual machine or a request to reset the first virtual machine.

3. The computer-implemented method of claim 1, wherein the first error message includes a state of a connection between the first virtual machine and an external resource.

4. The computer-implemented method of claim 1, wherein the corrective action includes resetting the first or second virtual machine or moving the first or second virtual machine from a first host device running the hypervisor to a second host device.

5. The computer-implemented method of claim 1, further comprising:
receiving a policy from the agent within the first virtual machine, the policy defining an action to take in managing the first virtual machine.

6. The computer-implemented method of claim 1, wherein the first error message is received via a trusted communication channel and independently of a networking stack of the first virtual machine.

7. A non-transitory computer-readable medium storing instructions, which when executed by a processing device, cause the processing device to perform method comprising:
receiving a first error message from an agent within a first virtual machine running on a hypervisor, the first error message indicating a problem with a functionality of the first virtual machine;
receiving a second error message from an agent within a second virtual machine, the second error message indicating a problem with a functionality of the second virtual machine;

determining a dependency between the functionality of the first virtual machine and the functionality of the second virtual machine;

determining a corrective action for the hypervisor to take in response to the determined dependency and the first and second error message; and initiating the corrective action with respect to the second virtual machine to address the problem with the functionality of the first virtual machine, wherein the corrective action is initiated in response to the determined dependency and the first and second error messages.

8. The non-transitory computer-readable medium of claim 7, wherein the first error message includes a state of an application running on the first virtual machine or a request to reset the first virtual machine.

9. The non-transitory computer-readable medium of claim 7, wherein the first error message includes a state of a connection between the first virtual machine and an external resource.

10. The non-transitory computer-readable medium of claim 7, wherein the corrective action includes resetting the first or second virtual machine or moving the first or second virtual machine from a first host device running the hypervisor to a second host device.

11. The non-transitory computer-readable medium of claim 7, the method further comprising:

receiving a policy from the agent within the first virtual machine, the policy defining an action to take in managing the first virtual machine.

12. The non-transitory computer-readable medium of claim 7, wherein the first error message is received via a trusted communication channel and independently of a networking stack of the first virtual machine.

13. An apparatus comprising a processing device, wherein the processing device executes instructions that cause one or more processors to:

receive a first error message from an agent within a first virtual machine running on a hypervisor, the first error message indicating a problem with a functionality of the first virtual machine;

receive a second error message from an agent within a second virtual machine, the second error message indicating a problem with a functionality of the second virtual machine;

determine a dependency between the functionality of the first virtual machine and the functionality of the second virtual machine;

determine a corrective action to take in response to the determined dependency and the first and second error messages; and initiate the corrective action with respect to the first virtual machine or the second virtual machine to address the problem with the functionality of the first virtual machine, wherein the corrective action is initiated in response to the determined dependency and the first and second error messages.

14. The apparatus of claim 13, wherein the first error message is a request to reset the first virtual machine or the first error message includes a state of an application running on the first virtual machine or a state of a connection between the first virtual machine and an external resource.

15. The apparatus of claim 13, wherein the corrective action includes resetting the first or second virtual machine or moving the first or second virtual machine from a first host device running the hypervisor to a second host device.

16. The apparatus of claim 13, wherein the instructions further cause the one or more processors to:

receive a policy from the agent within the first virtual machine, the policy defining an action to take in managing the first virtual machine.

17. The apparatus of claim 13, wherein the first error message is received via a trusted communication channel and independently of a networking stack of the first virtual machine.

* * * * *